United States Patent [19]

Sarbin et al.

[11] Patent Number: 5,179,517
[45] Date of Patent: Jan. 12, 1993

[54] GAME MACHINE DATA TRANSFER SYSTEM UTILIZING PORTABLE DATA UNITS

[75] Inventors: Theodore R. Sarbin, Reno; Paul R. Brugger, Carson City; Walter H. Wellman, Sparks; Darryl E. Kuhns, Reno, all of Nev.

[73] Assignee: Bally Manufacturing Corporation, Chicago, Ill.

[21] Appl. No.: 247,983

[22] Filed: Sep. 22, 1988

[51] Int. Cl.⁵ ............................................. G06F 15/28
[52] U.S. Cl. .................................. 364/410; 273/435; 340/706
[58] Field of Search ................ 364/410; 235/380, 375; 273/435; 340/706, 700

[56] References Cited

U.S. PATENT DOCUMENTS

| | | | |
|---|---|---|---|
| 4,004,133 | 1/1977 | Hannan et al. | 235/61.7 |
| 4,072,930 | 2/1978 | Lucero et al. | 340/152 |
| 4,283,709 | 8/1981 | Lucero et al. | 340/147 |
| 4,304,990 | 12/1981 | Atalla | 235/380 |
| 4,352,011 | 9/1982 | Guillou | 235/375 |
| 4,373,134 | 2/1983 | Grace et al. | 235/386 |
| 4,491,725 | 1/1985 | Pritchard | 235/375 |
| 4,494,197 | 1/1985 | Troy et al. | 364/412 |
| 4,501,960 | 2/1985 | Jouvet et al. | 235/488 |
| 4,511,796 | 4/1985 | Aigo | 235/492 |
| 4,531,187 | 7/1985 | Uhland | 364/412 |
| 4,532,419 | 7/1985 | Takeda | 235/492 |
| 4,544,834 | 10/1985 | Newport et al. | 235/487 |
| 4,575,621 | 3/1986 | Dreifus | 235/380 |
| 4,575,622 | 3/1986 | Pellegrini | 235/382 |
| 4,636,951 | 1/1987 | Harlick | 364/412 |
| 4,675,516 | 1/1987 | Guion | 235/441 |
| 4,725,924 | 2/1988 | Juan | 361/398 |
| 4,727,246 | 2/1988 | Hara et al. | 235/488 |
| 4,733,061 | 3/1988 | Hegi | 235/492 |
| 4,764,666 | 8/1988 | Bergeron | 235/380 |
| 4,864,116 | 9/1989 | Banjo et al. | 235/441 |

FOREIGN PATENT DOCUMENTS 2180460 7/1986 United Kingdom .

OTHER PUBLICATIONS

SDS-V (Slot Data System Five).

*Primary Examiner*—Gail O. Hayes
*Attorney, Agent, or Firm*—Jenner & Block

[57] ABSTRACT

The data transfer system operates by collecting data from game machines and transferring said data to a smart card type data transfer unit containing memory, addressing, control, and protection circuitry. Depending on the level of capability desired, the card may or may not have microprocessor and encryption circuitry. Various embodiments include systems that store data regarding cash flow, security violations, machine malfunctions, and volume of play attributable to an individual player, and transfer that data to a smart card for use in monitoring machine performance and determining the eligibility of a particular player to receive premiums as a play incentive. Additionally, either in concert with one or more of the above features or not the system can allow a player card to be used in lieu of cash to play game machines. In this instance, the player card can either be used as a pre-paid debit card, or as a credit card in which case money is collected from the player after he has played. Player cards can be used as a means of paying winnings to the player in any of these embodiments, with the player redeeming winnings and unused play entitlements at a cashier's station.

87 Claims, 3 Drawing Sheets

GAME MACHINE DATA TRANSFER SYSTEM UTILIZING PORTABLE DATA UNITS

TECHNICAL FIELD

The invention relates to the field of coin-operated amusement and gaming machine systems and in particular to systems for transferring data to and from such game machines.

BACKGROUND OF THE INVENTION

For several years, the automation of accounting and security functions having to do with coin-operated gaming machines has been shown to be a desirable and cost-effective method of obtaining accurate and timely data concerning the operation of these machines. In recent years, the automated accumulation of data concerning individual players, either in conjunction with the accounting and security information or without it, has also shown itself to be desirable as an effective marketing technique. Treating players in much the same manner as the airlines treat members of their "fragment flyer" clubs, game machine proprietors can, by keeping an accounting of the amount a player spends in their establishment, reward the patron accordingly. Also, by enrolling the player as a "preferred customer," the establishment can obtain a name and address, as well as certain other biographical and demographic data which is useful in the maintaining of a mailing list and other marketing efforts. There are also instances wherein the use of a player-carried device such as a magnetic-stripe card such as the card shown in U.S. Pat. No. 4,575,622 can be used to enable players to use coin-operated game devices by paying a lump sum in lieu of using individual coins. In these cases, the card is the means of identifying the player, while the actual accounting of play takes place in a central computer electronically connected to the gaming machines.

Another important function of gaming machine data transfer systems is to provide accounting and security information to casino operators. Most of these applications have in the past required the gaming machines to be directly connected to the central computer. Examples of such gaming machine data transfer systems are provided in U.S. Pat. Nos. 4,072,930, 4,283,709 and 4,636,951. This usually entails a large computer equipment installation, and the installation of an extensive network of data communication cables and associated equipment. And, since the central computer is usually connected to a large number of gaming machines, in some cases up to 2000 or more machines in a real time data communication configuration, a powerful and hence expensive central computer is required. Another disadvantage of these systems arises from the fact that the distance that the data can be transmitted is usually, as a practical matter, limited, thus the central computer is usually restricted to the same premises as the gaming machines. As a result, these electronic gaming machine information systems tend to be limited to gaming operations where a relatively large number of machines are located in close proximity to each other.

One approach to solving these problems was attempted in the SDS V system developed by Bally Systems Division of Bally Manufacturing Corporation in which a portable data recording unit having a microprocessor and limited semiconductor memory was used to collect data from slot machines. The data thus collected by an employee of the machine owner was transferred to a central data system when the recording unit was connected to a data input device in the central system. However, this approach suffered from a number of deficiencies including limitations in the type and amounts of data that could be collected, no capability to collect player information and no ability to transfer information to the slot machine.

SUMMARY OF THE INVENTION

It is therefore an object of the invention to provide a player or employee carried data unit along with a gaming machine interface that will permit the transmittal of player information and gaming machine information between gaming machines and a central data system.

It is a further object of the invention to provide a player carried data unit containing player account and win information along with player identification information that can be used to transmit player account information to a gaming machine and to receive from the gaming machine and transmit to a central data system player game play and gaming machine information.

It is an additional object of the invention to provide the data unit with data memory to store machine information and to receive from the gaming machine identification data identifying the machine along with machine data that can also be used as input to the central data system.

It is another object of the invention to provide an employee carried data unit that is capable of receiving from a game machine machine identification, along with dated machine identification, play and status data that can be used as input to a central data system.

It is still another object of the invention to provide the employee data unit with the capability to store machine control information and to input this information to selected gaming machines.

It is a further object of the invention to provide a portable data unit having a data memory and a microprocessor for physically transporting data representing player play data including credit and win data along with gaming machine operation data between a number of gaming machines and a central data system where the data memory contains data indicating whether a player is entitled to play incentives. The microprocessor can be used to increase the security of the overall system by encrypting and decrypting data entered into or read from the data memory.

The method by which the communication of data from the gaming machines to the central computer and vice versa is accomplished is by use of a portable data carrier, typically referred to as a "smart card." These devices are generally in the shape and size of a standard credit card, and contain solid-state memory, as well as circuitry to enable the memory to be written to, read from, and otherwise manipulated. In addition, some of these devices contain microprocessor circuitry, and are capable of data access control, data encryption, data decryption, and various other related tasks. Examples of such devices are disclosed in U.S. Pat. Nos. 4,675,516, 4,725,924, 4,727,246, 4,733,061 and 4,764,666.

Another very significant advantage of the invention relates to the fact that the function of the large central computer system can be replaced by a smaller minicomputer, or in some cases by one or more desktop personal computers. Since the need for real-time on-line communication with all the game machines does not exist in this application, the data processing functions of the system can be handled easily by the smaller computer system. Also, since the communication of data from the game machines to the computer system is not limited by a network of data communication cables, game machines need not be on the same premises as, or even in the near vicinity of, the computer system.

A further advantage of the invention flows from the elimination of the data communication hardware and the large central computer as discussed above so that the automation of the accounting, security, and player tracking functions can now be made available even to very small establishments and to operators that have small numbers or widely dispersed gaming machines which could not otherwise justify the cost of such a system.

DETAILED DESCRIPTION OF THE INVENTION

Figure 1:
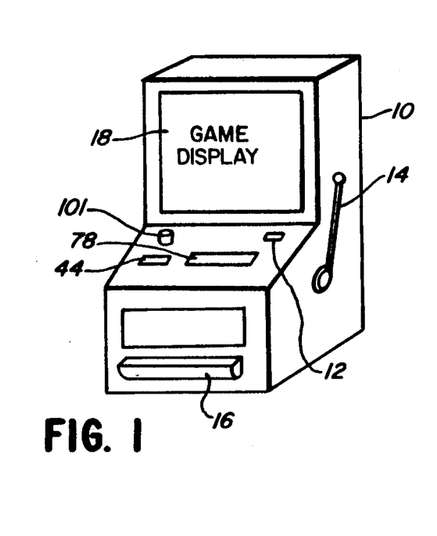
FIG. 1 is a perspective view of a gaming machine.

In FIG. 1 is provided a view of a typical gaming machine 10. The machine 10 as represented in FIG. 1 is a slot machine which in normal operation accepts a coin or token in a slot 12 and responds to a pull on a handle 14 by a player by depositing one or more coins in a coin tray 16 if a winning play is registered. A win or lose indication is provided to the player by a display 18 that in a slot machine normally takes the form of a group of mechanical reels or a video display. Although the gaming machine 10 shown in FIG. 1 is a slot machine, it should be understood that the invention can be equally applied to a wide variety of casino-type gaming machines including video poker and 21 machines as well as other coin operated amusement games.

Figure 2:
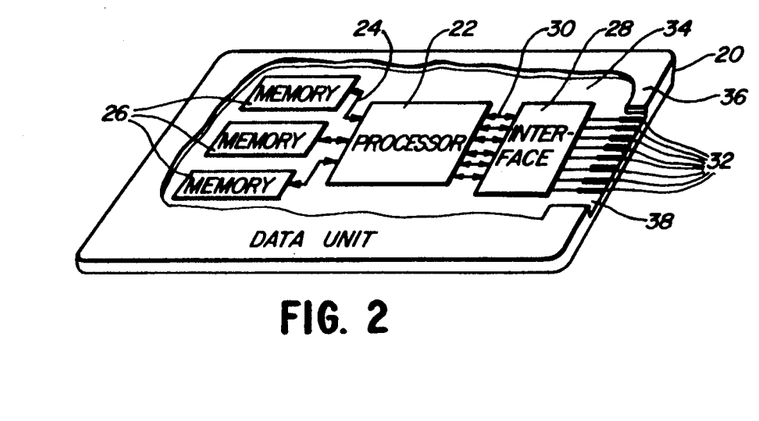
FIG. 2 is a partially cut away perspective view of a portable data transfer unit.

FIG. 2 provides a partially cut away view of the preferred embodiment of a portable data transfer unit 20. The data unit 20 includes a microprocessor 22 connected by data lines 24 to a number of non-volatile random access semiconductor memories 26. Microprocessor 22 is connected to an interface circuit 28 by a group of data and control lines indicated generally at 30. Communication to external devices is facilitated by a group of contacts 32 connected to the interface circuit 28. Preferably, these contacts conform to an industry standard such as ISO/DIS 78161/1 and 78161/2 and include contacts for: chip select signals; clock input signals; a data input signal; a data output signal; a power supply input; a status input signal, a ground line and a memory type signal.

The circuit elements 22, 26 and 28 can in effect function as a small computer system by, for example: accepting data and control signals from external devices connected to contacts 32; using the microprocessor 22 to process the data; reading and writing data into memory 26 and transmitting data and control signals via the interface circuit 28 to the external devices.

In the embodiment of FIG. 2, the circuit elements 22, 26 and 28 are mounted on a bottom sheet 34 and covered or sealed within the unit 20 by a cover sheet 36 with a portion 38 left open to provide access to the contacts 32. Preferably the data unit 20 has outer dimensions that correspond to a standard credit card. Examples of various types of structures that can be used for the portable data unit 20 are shown in U.S. Pat. Nos. 4,725,924, 4,727,246, 4,733,061 and 4,764,666.

Although the preferred embodiment of the portable data unit 20 has been described above in terms of an IC card or smart card, other configurations or structures that provide a data memory along with a data processing capability arranged in a conveniently portable package could serve as well.

Figure 3:
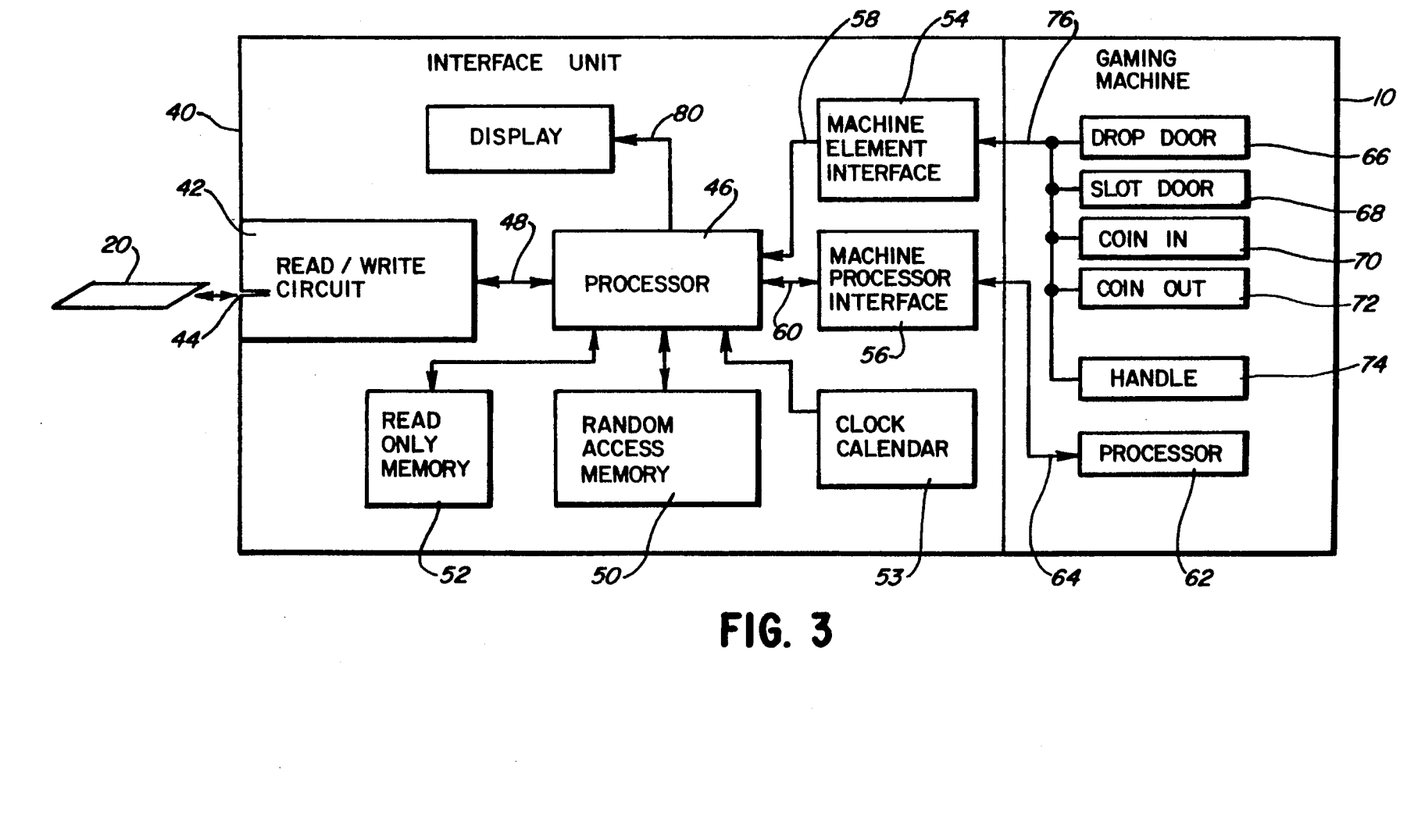
FIG. 3 is a functional block diagram of a gaming machine interface circuit for use with the data transfer unit of FIG. 2 along with a portion of the gaming machine circuitry.

Use of the data unit 20 with the gaming machine 10 is facilitated by an interface unit 40 secured within the housing of the gaming machine 10 as shown in FIG. 3. Although the preferred embodiment of the invention in FIG. 1 shows the interface unit 40 secured within the machine 10, the machine 10 can also include the interface unit 40 by attaching it as a separate unit to the exterior of the machine's 10 housing. A read/write unit 42 receives the data unit 20 via a slot 44 configured in the housing of the gaming machine 10. The read/write circuit 42 contains contacts corresponding to the contacts 32 of the data unit 20 along with conventional signal interface and buffering circuitry. Additionally included in the interface unit is a microprocessor 46 connected to the read/write unit 42 by data and control lines represented by a line 48 and a random access memory 50 along with a read only memory 52 that contains control instructions for the processor 46. A clock-calendar circuit 53 is also connected to the processor 46.

Since the preferred embodiment of the invention is described within the context of a microprocessor based slot machine 10, the interface unit 40 also includes a machine element interface circuit 54 and a machine processor interface circuit 56 connected to the processor 46 by data and control lines represented by lines 58 and 60 respectively. The slot machine 10 includes, as shown in FIG. 3, a microprocessor 62 that communicates with the machine processor interface 56 via a data bus 64. As is conventional with microprocessor based gaming machines including video poker and other types of gaming machines, the microprocessor 62 controls the operation of the machine 10. Slot machines of the type shown in FIG. 3 also have a number of discrete signal sources that represent the status of the machine. Representative examples of status signals generated in the slot machine 10 are: drop door status 66, slot door status 68, a coin in signal 70, a coin out signal 72 and a handle pull signal 74. The signal sources 66-74 are connected to the machine element interface 54 by a series of lines represented for simplicity by a single line 76.

The preferred embodiment of the interface unit 40 additionally includes a display 78 which is connected to the microprocessor 46 by a conventional set of data, address and control lines as represented by a line 80.

Figure 4:
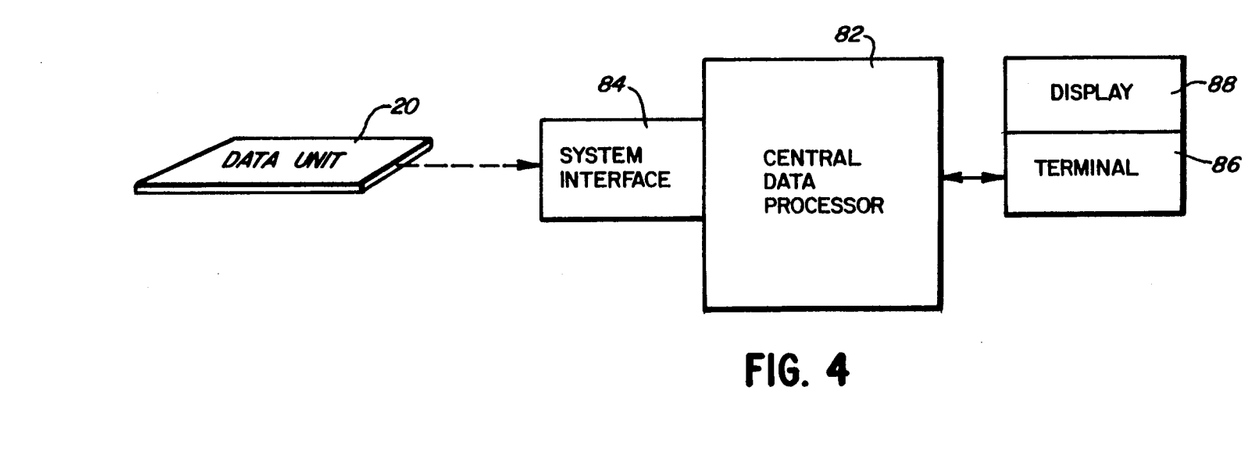
FIG. 4 is a functional block diagram of a central data processing system for use with the data transfer unit of FIG. 2.

Also, as illustrated in FIG. 4, the data transfer system includes a central data processor 82 to perform general casino accounting functions and which receives the data unit 20 in a system interface circuit 84. The interface circuit 84 includes contacts and a read/write circuit (not shown) which is similar in operation to the read/write circuit 42 of FIG. 3. The system of FIG. 4 can also have one or more data input terminals 86 and displays 88. Depending upon circumstances such as the number and locations of gaming machines 10 and the functions to be performed by the central data processing system of FIG. 4, the preferred embodiment of the hardware arrangement will vary. For example, in some instances where a large number of machines 10 are being administered in a centralized accounting system the central data processor 82 would be a minicomputer with one or more terminals 86 directly connected to the computer 82 in the same location. On the other hand, where a fewer number of gaming machines 10 are to be administered or a more decentralized accounting system is used, one or more personal computers can be used for the data processor 82, terminal 86 and display 88. Where it is desired to use more than one personal computer to perform the functions of the system of FIG. 4, and it is considered important to maintain centralized control of the gaming data and transactions, a data communication network such as a local area network can be used to operatively tie the computers 82 together.

In any event, the system as illustrated in FIGS. 1–4 provides substantially enhanced flexibility along with increased operational capabilities in a gaming machine data and control system while at the same time reduces hardware requirements and costs.

Figure 5:
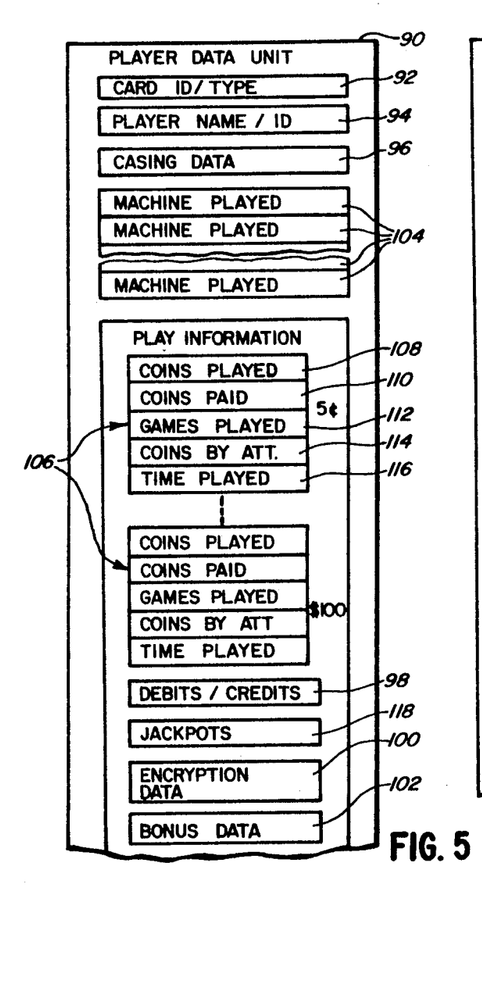
FIG. 5 is a diagram of memory organization for a player data transfer unit.

Operation of the system of FIGS. 1–4 will now be described in connection with the memory diagrams of FIGS. 5–7. With reference to FIG. 5 which illustrates the data organization in the memory 26 in a first embodiment 90 of the portable data unit 20 of FIG. 2 for use by a player, the data unit or card 20 at the time that it is first issued to a player by a casino or game operator is inserted into the system interface 84 of the central system of FIG. 4. At this point the various data fields in the memory 90 are initialized.

A first field 92 is loaded with data indicating the type of card and an identification number for that particular card 20. As will be described below, there are a number of different types of cards 20 that can be employed by this system. At this time data identifying the player is also written into a data field 94. This information is particularly important due to the fact that many casinos base their marketing programs around the amount of activity of individual players or customers and as such it is very useful to be able to track the amount of play activity of each player. In this manner, for example, premiums and bonuses can be awarded to particularly active players thereby encouraging further play on the part of the individual. In addition, this information can be used to compile lists of preferred customers which is useful from a marketing standpoint.

Another data field 96 can be used to store casino or card data such as an identification of the casino, the location of the issuing system, player account number and the number of times that the particular card 20 has been used.

In the event that the card 20 is to be used as a debit or a credit card to play the gaming machines 10, that information is loaded into a debit/credit field 98 by a casino employee using the terminal 86. If the card 20 is used as a debit card the employee accepts payment and loads the appropriate monetary value in the field 98 or if the card 20 is to be used as a credit card, the employee authorizes the amount of credit that the particular player is entitled to and loads that amount into field 98.

By the same token, the information in the field 98 can be used by the casino employee using terminal 86 to pay or credit the player when the card is redeemed or presented for payment.

Since security is an extremely important consideration in casino operations, the memory 90 can also include an encryption data field 100 which can contain encryption keys or algorithms. As will be described in more detail later, the data in field 100 can be used by the interface unit 40 to ensure that the card 20 is an authorized card. Also the data in the other fields of the memory 90 can be encrypted such as the debit/credit field 98 in order for example to discourage players from taking the card 20 home to increase on their own the value of the credits in that field.

After the player card 20 having memory organization 90 is initiated, it is ready for use with the gaming machine 10. The player will insert the card 20 into the read/write circuit 42 of the interface unit 40 as shown in FIG. 3 via slot 44. The read/write circuit 42 is under the control of the microprocessor 46 and causes this circuit 46 to transmit to the microprocessor 22 on the card 20 the appropriate instructions so that the identifying data in fields 92 and 94 are transmitted to the processor 46. Depending upon the level of security desired the processor can also access encryption keys or passwords from field 100 to use with an encryption algorithm or password procedure stored for example in ROM 52 to determine if the card 20 is authorized. The information stored in field 100 can additionally include access control codes and codes defining the functions and access capabilities of the card 20. Alternatively the card microprocessor 22 can encrypt using, for example, one of the NBS encryption standards the data being transmitted to the processor 46 and the processor 46 can in turn use a matching algorithm to decrypt the data.

Once the card 20 has established communication with the interface unit 40 and been identified as a player type card, the interface unit 40 will make available to the gaming machine 10 the debit or credit information contained in card field 98. In the embodiment shown in FIG. 3, this information is transmitted by way of the machine interface 56 to the gaming machine microprocessor 62. In gaming machines of this type the player has the option of selecting by means of a control button or switch indicated at 101 on the machine housing 10, credit or coin operation.

One of the more significant features of the invention is a comprehensive player tracking capability. As the player operates the machine, data representing game play is transmitted by the interface unit to the memory 90 of the card 20. For example, the identification of the machine being played is stored in a data field 104 as shown in FIG. 5. In the preferred embodiment of the invention the identification of the last ten machines 10 played are stored in fields 104. In addition, specific information relating to the games played is also stored in card memory 90. In the embodiment shown in FIG. 5, eight data fields indicated generally at 106 are provided to store information relating to player activity. Here, there is one field 106 for each denomination: nickel, dime, quarter, half-dollar, dollar, $5, $25 and $100. Within each field 106 there is a group of subfields for storing the number of: coins played 108, coins paid out 110 the number of games played 112 and the number of coins paid by attendants 114 for each denomination. Also, the time of play in minutes for that denomination is stored in a subfield 116. It will be understood, of course, that the amount and types of data stored in the game play fields such as 106 of memory 90 can be varied to suit a particular casino operating environment. In addition to the play data discussed above the memory 90 contains a data field 118 to store information relating to the jackpots or other major prizes won by the players.

In the preferred embodiment of the invention, the interface unit 40 performs the calculations necessary to compute the players bonus or premium award status and stores that status in a bonus data field 102 in the card memory 90. The bonus status can be based on a wide variety of information and criteria such as the number of games or time the machine 10 is played as received from the machine processor 62 along with other data obtained from the card memory 90. For example, player bonus status can be calculated on the player's "volume of play" which can include one or more of the following factors: coins played, number of handle pulls, amount won, length of time played, payouts, length of time played without a win, etc. Use of the processor 46 in the interface unit 40 to perform this function has a number of advantages including immediate access to relevant information about the individual player and a complete operational separation and non-interference with the operation of the gaming machine 10.

The use of the card or data transfer unit 20 enhances the data gathering ability of the gaming machine data transfer system when the player redeems the card 20. Typically the player will hand the card 20 to a casino employee who will insert the card 20 into the system interface 84 of the central data system of FIG. 4. Upon receiving and verifying the data from card 20 the central data processor 82 can, either automatically or at the request of an employee operating the terminal 86, clear selected portions of memory 90, thus preparing the card 20 for future data collection. The system of FIG. 4 can also display on display 88 or print out reports on information and calculations based on the data thus collected. At this point the player, based on the data displayed, can receive payment or credit derived from the information on the card 20. In particular, the player's individual account status is printed out or displayed on display 88 so that the casino employee can determine what prizes, premiums or awards that the player may be entitled to. If such awards are made by the employee, this information is entered into the system of FIG. 4 via the terminal 86 resulting in a decrementing of the bonus data in field 102 of card memory 90. As with the interface unit 40, it is the system interface 84, which is functionally similar in construction to interface 40, that actually performs the reading from, writing to and clearing of card memory 90.

Cashless gaming is also facilitated by use of the card 20 in combination with the system of FIGS. 3 and 4. When the player is issued a card 20 or presents a previously issued card to a casino employee, the employee will insert the card 20 into the system interface 84 and by using the terminal 86 updates the debit or credit balance in field 98 of card memory 90. Upon receipt of the card 20 in interface unit 40, the processor 46 first verifies that there is sufficient value in field 98 to play the machine 10 and then via machine interface 56 enables the machine 10 for credit play. The player by utilizing the machine control 101 can select normal payouts via the coin tray 16 or to have the balance on field 98 reflect his winnings. Win data if the option is selected, is transmitted from the machine processor 62 through the interface unit to data field 98. The credit or debit status, which can be termed account status, as reflected in field 98 is provided to the player by the display 78 which is controlled by the processor 46.

A related feature of the interface unit 40 is the ability to provide information on the display 78 in addition to the player's debit or credit balance. For example, using the data stored in memory 90, the processor 46 can display the player's name in a personalized welcoming message along with other player specific information such as any bonuses or prizes he may be entitled to as indicated in data field 102.

The use of the portable data transfer unit 20 has a number of very significant advantages in collecting data regarding gaming machine operation and security as well. As shown in FIG. 6, a portion 120 of the card memory 26 can be configured to collect data relating to machine operation. Although the memory 120 as shown in FIG. 6 is structured for a particular type of card 20, it should be understood that the data organization could be incorporated into other types of cards such as the player card 20 of FIG. 5. For purposes of this description the data fields in FIGS. 5–7 that contain similar types of data will have the same reference numerals.

Figure 6:
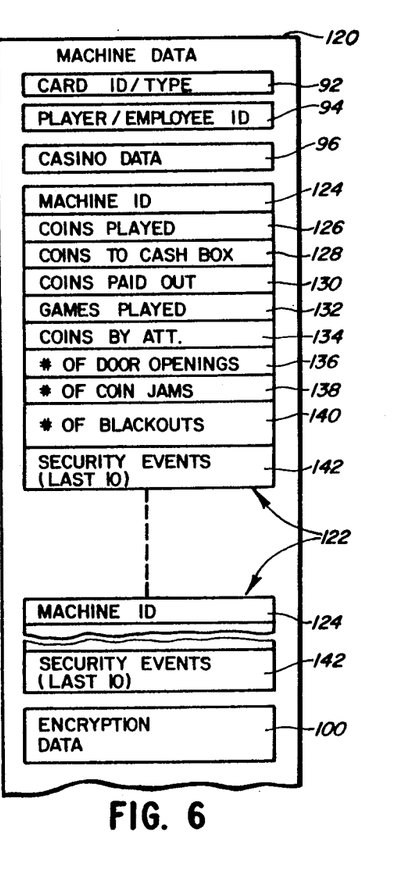
FIG. 6 is a diagram of memory organization for a machine data transfer unit.

With respect to FIG. 6, if the card 20 containing memory 120 is an employee issued card data field 92 will reflect that fact and data field 94 will contain the employee's identification. In the embodiment of the memory organization 120, shown in FIG. 6, there are a group of data fields indicated at 122 each of which corresponds to a particular gaming machine. The data fields 122 are each divided into a number of subfields. When the card 20 is inserted into the interface unit 40 the processor 46 will write the gaming machine 10 identification in a first subfield 124. During normal operation of the gaming machine 10 accounting and security data is transmitted via the machine element interface 54 and the processor interface 56 to the interface processor 46 and stored in the memory 50. Preferably this data is time and date stamped by the processor 46. After the card 20 has been verified by processor 46 and the machine identification stored in the subfield 124, the processor 46 will write machine accounting information such as: the number of coins played into a subfield 126; the number of coins in the gaming machine 10 cash box into a subfield 128; the number of coins paid out by the machine 10 into a subfield 130; the number of games played for card-type gaming machines or handle pulls for slot type gaming machines into a subfield 132 and the number of coins paid by attendants to players into a subfield 134. Similarly, security information such as the number of gaming machine door openings will be written into a subfield 136; the number of coin hopper jams will be written into a subfield 138 and the number of blackouts, that is interruptions of electrical power to the machine 10, will be written into a subfield 140. Also, the last ten security events such as tilts and illegal pays recorded in the memory 50 will be written into a subfield 142. Along with the data as described above appropriate date-time information corresponding to the data will be written into the subfields 126–142 as well. It should be noted that the use of a separate processor 46 and memory 50 in the interface unit 40 makes possible a particular convenient method of gathering and retaining time information which can be very useful from a security standpoint. As with the player data unit 90, the employee card having memory organization 120 would be inserted into the system interface 84 and the machine data transferred from the card 20 to the central data processor 84.

As indicated above, the memory 26 of the data transfer unit 20 can store various types of player and machine data. For example, it would be possible to include portions of the data organization 120 in the data organization 90 of the player card 20. In this manner the players would collect at least a portion of the machine information of FIG. 6 in the course of playing the gaming machine 10. This could reduce the need for casino employees to make regular checks of the status and performance of the gaming machines and provide more current information with respect to at least the more heavily patronized machines.

Figure 7:
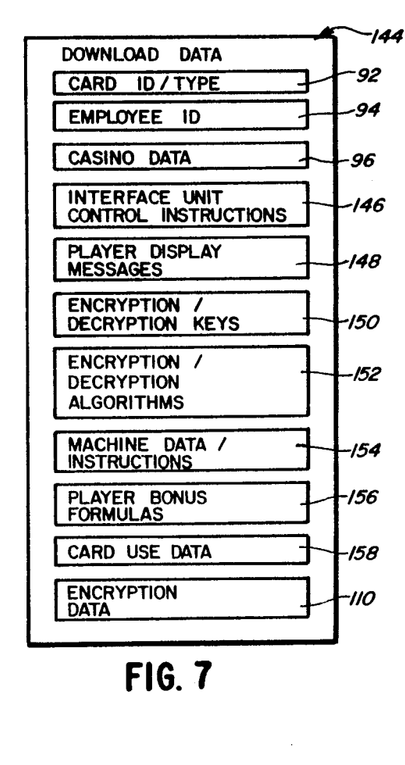
FIG. 7 is a diagram of a down load data transfer unit.

A third type of data organization 144 for use with the data transfer unit 20 is illustrated in FIG. 7. The cards having this type of data would be used by casino employees for down loading control programs and data to the gaming machine 10 and interface unit 40. Examples of such control instructions and data include control instructions for the interface unit processor 46 stored in a field 146 and player messages for use with the display 78 stored in a field 148. Updates for the interface units 40 encryption/decryption keys and passwords can be stored in a data field 150 and revised encryption algorithms for use by the processor 46 can be stored in a data field 152. A data field 154 can contain new or revised computer programs for controlling the gaming machine processor 62 along with control variables that the processor 62 employs, for example, in setting the win percentage of the gaming machine 10. The data in memory 144 can also include a field 156 storing formulas used by the interface unit processor 46 to calculate the player bonus or premiums.

Also shown in FIG. 7 is a field 158 for storing card use data. This data is written into field 158 by the interface unit 40 each time the card 20 is used with a gaming machine 10 and as such provides the central data system of FIG. 4 and hence casino management with valuable information regarding card usage. Although not shown in FIGS. 5 and 6 it is considered desirable in the preferred embodiment of the invention to include a similar data field in the player card memory 90 and the machine data memory 120.

From the above discussion it is apparent that the use of the portable data unit or card 20 having a data processing capability in combination with computer controlled gaming machine interface units 40 provides a gaming machine information transfer system of great flexibility and low cost with the ability to generate useful information for casino management. Although the invention has been described in terms of its use with gaming machines that return money to the player, such as slot machines or video poker machines, many of the aspects of the invention would apply to coin-operated amusement type games as well. Thus, certain aspects of the invention relate to game machines in general which include gaming machines along with amusement games.

We claim:

1. A data transfer system for use with a plurality of coin operated game machines having game machine processors comprising:

a portable data unit including a data memory for storing machine and player data;

a plurality of interface units, wherein each of the game machines includes one of said interface units adapted to physically receive said data unit, for transmitting selected data from the game machine processor to said data memory and for modifying said player data in response to at least a portion of said selected data; means for transmitting selected machine data and player data from said data memory to the game machine and a central data processor located remotely from the gaming machines and adapted to physically receive said data unit and including means to directly access said selected data and said player data from said data unit.

2. The system of claim 1 wherein said interface units are adapted to transmit said player data from said portable data unit to said interface units.

3. The system of claim 2 wherein at least a portion of said data in said data memory including said player data is in encrypted form and said interface units include means for decrypting said player data.

4. The system of claim 3 wherein said interface units include means for encrypting said modified player data and transmitting said encrypted modified player data to said portable data unit data memory.

5. The system of claim 3 wherein said data unit includes processor means for encrypting data received from said interface unit.

6. The system of claim 1 wherein said portable data unit includes player identification data in said data memory.

7. The system of claim 1 wherein said interface units includes means for transmitting said modified player data to said data memory.

8. The system of claim 7 wherein said player data includes player bonus information.

9. The system of claim 8 wherein said interface units compute said bonus information based on the volume of play.

10. The system of claim 1 wherein said selected data includes identification of the game machine currently being played.

11. The system of claim 10 wherein said data memory can store a plurality of said game machine identifications.

12. The system of claim 10 wherein said selected data additionally includes machine play information for each game machine played.

13. The system of claim 12 wherein said machine play information includes the number of coins paid into the machine and the number of coins paid out by each game machine played.

14. The system of claim 12 wherein said machine play information includes the time the game machine is played.

15. The system of claim 12 wherein said interface unit includes data means for adding data and time information to said machine play information.

16. The system of claim 1 wherein said data stored in said portable unit data memory includes player account data and wherein said interface unit includes means for accessing said account data from said data memory and transmitting it to said game machine to authorize play of the game machine along with means to update said account data in said data memory resulting from play of the game machine.

17. The system of claim 1 wherein said interface unit additionally includes display means for displaying said player data to the player.

18. The system of claim 17 wherein said player data being displayed includes players bonus information.

19. The system of claim 18 wherein said information being displayed includes player account information.

20. The system of claim 1 wherein said portable data unit includes a processor for controlling read and write access to said data memory.

21. The system of claim 20 wherein at least a portion of said data stored in said data memory is in encrypted form and wherein said processor includes means for encrypting data received from said interface unit and said central data processor.

22. The system of claim 20 wherein said processor includes means for decrypting data transmitted from said data memory to said interface unit and said central data processor.

23. The system of claim 1 wherein said data memory includes card use data and wherein said interface unit includes means for updating said card use data in said data memory.

24. A data transfer system for use with a plurality of coin operated game machines having game machine processors comprising:
   a portable data unit including a data unit processor and a data memory operatively connected to said data unit processor for storing machine information;
   a plurality of interface units wherein each of the game machines includes one of said interface units adapted to physically receive said data unit and wherein said interface units include an interface processor adapted to communicate data to and from the game machine processor and to and from said data unit processor; and
   a central data processor located remotely from the game machines and adapted to physically receive said data unit and including means to directly communicate with said data unit processor.

25. The system of claim 24 wherein said machine information includes data relating to the game machine operation and security.

26. The system of claim 25 wherein said data unit data memory includes a plurality of machine data fields wherein each of said machine data fields includes machine subfields for storing a machine identification, machine operation data and machine security data.

27. The system of claim 26 wherein said machine security data includes a predetermined number of the last security events that occurred in the game machine.

28. The system of claim 27 wherein said machine operation data includes the number of coins paid into the game machine, the number of coins paid out by the game machine, and the number of coins paid by an attendant.

29. The system of claim 28 wherein the machine operating data includes the number of game machine door openings, the number of coin jams and the number of machine blackouts.

30. The system of claim 24 wherein said interface unit includes date means operatively connected to said interface processor for associating date and time information with selected portions of said game machine information received from the game machine and wherein said interface unit is effective to transmit said game machine information with said associated date and time information to said data unit data memory.

31. The system of claim 24 wherein said data unit data memory additionally includes player information and said data unit processor cooperates with said interface processor to transmit said player information to and from said data unit data memory to said interface unit.

32. The system of claim 31 wherein said data unit data memory additionally includes player identification.

33. The system of claim 24 wherein said data unit data memory additionally includes card type identification and wherein said interface unit processor selects data transmitted to an from said data unit in response to said card type identification.

34. The system of claim 33 wherein at least a portion of said data stored in said data unit data memory is in encrypted form and wherein said interface unit processor includes means for decrypting said encrypted data received from said data unit and for encrypting data transmitted to said data unit.

35. The system of claim 33 wherein at least a portion of said data stored in said data unit data memory is in encrypted form and wherein said data unit processor includes means for encrypting data received from said interface unit.

36. The system of claim 24 wherein said data unit data memory includes game machine processor control variables and said interface unit processor includes download means for transferring said game machine control variable to the game machine.

37. The system of claim 36 wherein said game machine control data in said data unit data memory is in encrypted for and said interface unit processor additionally includes means for decrypting said game machine control data.

38. The system of claim 37 wherein said game machine data includes decryption keys for use by said interface unit processor.

39. The system of claim 36 wherein said game machine data includes decryption algorithms for use by said interface unit processor.

40. The system of claim 24 wherein said data memory includes card use data and said interface processor is effective to update said card use data.

41. A data transfer system for use with a plurality of coin operated game machines having game machine processors comprising:
   a portable data unit including a data unit processor and a data memory operatively connected to said data unit processor for storing machine information including game machine computer programs;
   a plurality of interface units wherein each of the game machines includes one of said interface units adapted to physically receive said data unit and wherein said interface units include an interface processor adapted to directly download said game machine computer programs to the game machine from said data unit data memory; and
   a central data processor located remotely from the game machines and adapted to physically receive said data unit and including means to directly transmit said game machine computer programs to said data unit data memory.

42. The system of claim 41 wherein at least a portion of said machine information in said data unit data memory is in encrypted form.

43. The system of claim 42 wherein said interface unit processor includes decryption means for decrypting said machine information.

44. The system of claim 43 wherein said data unit data memory additionally includes encryption data for use by said decryption means.

45. The system of claim 44 wherein said encryption data includes decryption keys.

46. The system of claim 41 wherein said data unit data memory includes card information including card identification.

47. The system of claim 46 wherein said card information includes employee identification.

48. The system of claim 46 wherein said card information includes card use data and wherein said interface unit processor updates and transmits said card use data to said data memory.

49. The system of claim 41 wherein said data unit data memory includes casino data.

50. The system of claim 41 wherein said interface unit additionally includes display means for displaying messages to players and wherein said data unit data memory includes said messages and wherein said interface unit processor is adapted to access said messages from said data unit memory.

51. The system of claim 41 wherein said data unit data memory includes interface unit processor control instructions and wherein said interface unit processor is adapted to access said instructions.

52. The system of claim 41 wherein said interface control instructions are in encrypted form and said interface unit processor includes decryption means for decrypting said interface control instructions.

53. The system of claim 52 wherein said data unit data memory additionally includes keys for use by said decryption means.

54. The system of claim 52 wherein said data unit data memory additionally includes decryption algorithms for use by said decryption means.

55. A data transfer system for use with a plurality of coin operated game machines having game machine processors comprising:
   a portable data unit including a data memory;
   a plurality of interface units wherein each of the game machines includes one of said interface units adapted to physically receive said data unit and wherein said interface units include an interface processor adapted to communicate data to and from the game machine processor and to and from said data unit; and
   a central data processor located remotely from the game machines adapted to physically receive said data unit and including means to directly communicate with said data unit.

56. The system of claim 55 wherein said data memory contains a card type designation.

57. The system of claim 56 wherein said card type designation indicates that said data unit is a player issued unit.

58. The system of claim 56 wherein said card type designation indicates that said data unit is an employee issued unit.

59. The system of claim 55 wherein said data memory contains personal information relating to the individual issued said data unit.

60. The system of claim 55 wherein said data memory contains casino identification data.

61. The system of claim 55 wherein said data memory contains encryption data.

62. The system of claim 61 wherein at least a portion of the data contained in said data memory is encrypted and wherein said data unit includes means for encrypting data applied to said data unit into said encrypted data.

63. The system of claim 62 wherein said interface unit includes decryption means that utilizes encryption keys stored in said data memory for decrypting said encrypted data.

64. The system of claim 55 wherein said interface unit transmits card use data to said data memory.

65. The system of claim 56 wherein said data memory contains information relating to the identification of the individual issued the card.

66. The system of claim 57 wherein said data memory contains card type information.

67. The system of claim 66 wherein said data memory contains casino information.

68. The system of claim 55 wherein said data memory contains access control codes and wherein said interface unit includes means responsive to said access control codes to access data from said interface unit.

69. The system of claim 68 wherein said access control codes define the function of said data unit with respect to said interface unit.

70. The system of claim 55 wherein said data memory contains player bonus data and wherein said interface unit includes means to update said bonus data in said data memory.

71. The system of claim 70 wherein said interface means additionally includes display means for displaying said bonus data.

72. The system of claim 55 wherein said data memory contains player account data and wherein the game machine includes player operated control means for selectively allowing a player to obtain credit for winning machine plays instead of receiving coins and wherein said interface unit utilizes said winning credit information to update said account data in said data memory.

73. The system of claim 72 wherein said interface unit additionally includes display means for displaying said account data.

74. The system of claim 59 wherein said data memory additionally includes play information received from said interface unit.

75. The system of claim 74 wherein said play information includes the number of coins played and the number of coins received by the player.

76. The system of claim 75 wherein said play information includes separate data for each coil denomination.

77. The system of claim 75 wherein said play information additionally includes the number of games played by the player.

78. The system of claim 75 wherein said play information additionally includes the time of play of the player.

79. The system of claim 74 wherein said play information includes the number of jackpots won by the player.

80. The system of claim 74 wherein said play information includes the identification of game machines played by the player.

81. The system of claim 74 wherein said data memory additionally includes machine data transmitted from the game machine by said interface unit to said data memory.

82. The system of claim 81 wherein said machine data includes game machine identification and coin data for the game machine.

83. The system of claim 74 wherein said machine data includes game machine identification and security information for the game machine.

84. The system of claim 81 wherein said interface unit additionally includes time means for adding time related information to said machine data transmitted to said data memory.

85. The system of claim 84 wherein said time means includes a clock calendar circuit operatively connected to said interface unit processor.

86. The system of claim 84 wherein said machine data having time related information includes game machine security information.

87. The system of claim 71 wherein said data memory includes bonus data and wherein said interface unit processor includes means for accessing said bonus information, updating said bonus in response to game play information from the game machine and storing said updated bonus information in said data memory and wherein said display means additionally includes means for displaying said updated bonus data.

* * * * *

UNITED STATES PATENT AND TRADEMARK OFFICE
CERTIFICATE OF CORRECTION

PATENT NO. : 5,179,517
DATED : January 12, 1993
INVENTOR(S) : Theodore R. Sarbin et al.

It is certified that error appears in the above-identified patent and that said Letters Patent is hereby corrected as shown below:

Column 10, line 30, delete "includes" and insert -- include --

Column 10, line 68, delete "players" and insert -- player --

Column 12, line 8, delete "an" and insert -- and --

Column 12, line 28, delete "for" and insert -- form --

Signed and Sealed this

Second Day of November, 1993

Attest:

BRUCE LEHMAN

*Attesting Officer*     Commissioner of Patents and Trademarks